(12) United States Patent
Alberte et al.

(10) Patent No.: US 6,913,854 B1
(45) Date of Patent: Jul. 5, 2005

(54) METHOD AND APPARATUS FOR GENERATING POWER FROM VOLTAGE GRADIENTS AT SEDIMENT-WATER INTERFACES

(75) Inventors: Randall Alberte, Falmouth, ME (US); Harold J. Bright, Arlington, VA (US); Clare Reimers, Philomath, OR (US); Leonard M. Tender, Bethesda, MD (US)

(73) Assignees: Rutgers, The State University of NJ, New Brunswick, NJ (US); The United States of America as represented by the Secretary of the Navy, Washington, DC (US)

(*) Notice: Subject to any disclaimer, the term of this patent is extended or adjusted under 35 U.S.C. 154(b) by 452 days.

(21) Appl. No.: 10/148,104
(22) PCT Filed: Oct. 20, 2000
(86) PCT No.: PCT/US00/28983
§ 371 (c)(1), (2), (4) Date: Sep. 17, 2002
(87) PCT Pub. No.: WO01/39306
PCT Pub. Date: May 31, 2001

Related U.S. Application Data
(60) Provisional application No. 60/166,995, filed on Nov. 23, 1999.

(51) Int. Cl.$^7$ .............................. H01M 6/34; H01M 8/06
(52) U.S. Cl. ............................ 429/119; 429/2; 429/17; 429/19; 429/46
(58) Field of Search ............................... 429/2, 17, 19, 429/46, 119

(56) References Cited

U.S. PATENT DOCUMENTS

| | | | |
|---|---|---|---|
| 4,085,254 A | 4/1978 | Atkins | 429/2 |
| 4,278,743 A | 7/1981 | Thompson | 429/119 |
| 5,158,838 A | 10/1992 | Bjordal et al. | 429/50 |
| 5,242,768 A | 9/1993 | Nagatsuka et al. | 429/127 |
| 5,288,564 A | 2/1994 | Klein et al. | 429/94 |
| 5,427,871 A * | 6/1995 | Garshol et al. | 429/119 |
| 5,770,945 A | 6/1998 | Constable | 324/350 |
| 5,922,903 A | 7/1999 | Pujado | 562/98 |
| 6,575,248 B2 * | 6/2003 | Zhang et al. | 166/338 |

FOREIGN PATENT DOCUMENTS

| | | | | |
|---|---|---|---|---|
| WO | WO 2001/39306 | * | 5/2001 | H01M/6/34 |

OTHER PUBLICATIONS

Reimers, C.E. et al. "Harvesting Energy from Marine Sediment–Water Interface" Environ. Sci. Technol. 2001, 35,192–195, Nov. 16, 2000.*

Bond D.R. et al. "Electrode Reducing Microorgaisms that Harvest Energy from Marine Sediments" Science, vol. 295, 483–485 Jan. 18, 2002.*

Tender, L.M. et al. "Harnessing Microbially Generated Power on the Seafloor" Nature Biology, vol. 20, pp. 821–825, Aug. 2002.*

*Primary Examiner*—Mark Ruthkosky
(74) *Attorney, Agent, or Firm*—McCarter & English, LLP

(57) ABSTRACT

A method and apparatus for generating power from voltage gradients at sediment-water interfaces or within stratified euxinic water-columns is provided. Natural voltage gradients typically exist at and about sediment-water interfaces or in isolated water bodies. One electrode (anode) is positioned in the sediment or water just below the redox boundary and the other electrode (cathode) is positioned in the water above the redox boundary over the first electrode. The anode is lower in voltage than the cathode. Current will flow when the electrodes are connected through a load, and near-perpetual generating of worthwhile power may be sustained by the net oxidation of organic matter catalyzed by microorganisms.

22 Claims, 1 Drawing Sheet

OTHER PUBLICATIONS

DeLong, E.F. et al. "Power From the Deep" Nature Biology, vol. 20, pp. 788–789, Aug. 2002.*

Bilal, "Thermo–Electrochemical Reduction of Sulfate to Sulfide Using a Graphite Cathode," J. Appl. Electrochem., 28, 1073, (1998).

Habermann, et al., "Biological Fuel Cells With Sulphide Storage Capacity," Applied Microbiology Biotechnology, 35, 128, (1991).

Zhang, et al., "Modelling of a Microbial Fuel Cell Process," Biotechnology Letters, vol. 17 No. 8, pp. 809–814 (Aug., 1995).

* cited by examiner

METHOD AND APPARATUS FOR GENERATING POWER FROM VOLTAGE GRADIENTS AT SEDIMENT-WATER INTERFACES

RELATED APPLICATIONS

This application claims the benefit of provisional application U.S. Ser. No. 60/166,995 filed Nov. 23, 1999. The disclosure of this application is incorporated herein by reference.

GOVERNMENT RIGHTS

The present invention has been made under the contract with DARPA/ONR, Contract No. N00014-98-1-0690 and the government may have certain rights to the subject invention.

BACKGROUND OF THE INVENTION

1. Field of the Invention

The present invention generally relates to generating power from voltage gradients that exist naturally and in association with chemical changes across the interface of water saturated sediments and within stratified water bodies found in aquatic environments.

2. Related Art

Presently, low power (up to 1 Watt continuous average) consuming marine deployed unattended electronics (such as sonar beacons and sensors) are powered by batteries (including conventional lead-acid, alkaline, lithium and seawater), by solar cells, or by direct links to ground available power by means of power conducting cables.

Each of these conventional power sources suffer deficiencies. Conventional batteries are impractical sources of low power for more than one year because they are heavy, bulky, expensive, limited in duration by self-discharge (1–3 years), and commonly fail under deployment conditions in which they are contained in pressure-compensated or pressure resistant vessels. Seawater batteries specifically designed for low power consuming autonomous marine deployed instrumentation provide 1–2 Watts continuous power for up to three years, limited by depletion of the anode. Solar cells are impractical sources of long-term power for marine deployed instrumentation due to sensitivity to weather and difficulty in maintaining their integrity on the marine surface. Direct cables are impractical sources of low power for marine deployed instrumentation due to cost and logistics.

While it is known that microbial decomposition of organic matter in marine sediments and in stratified water columns will result in the utilization of a succession of oxidizing agents and that this creates a natural voltage gradient, such natural voltage gradients and associated processes are not known to have ever been used as a power source.

What is needed, and has not heretofore been provided, is a method and apparatus of providing power to aquatic deployed devices for prolonged time periods that takes advantages of the natural voltage gradients found at and below sediment-seawater interfaces or within euxinic water bodies.

OBJECTS AND SUMMARY OF THE INVENTION

It is a primary object of the present invention to generate power from voltage gradients established across water saturated sediments and water found in naturally occurring aquatic environments.

It is an additional object of the present invention to provide a method and apparatus for generating energy from microbial established chemical gradients at marine sediment-seawater interfaces.

It is another object of the present invention to provide a method and apparatus for providing power to aquatic deployed equipment for extended periods of time.

It is even another object of the present invention to provide power to aquatic deployed electronics for years.

It is yet another object of the present invention to provide a power source for marine deployed electronics which is naturally replenished.

It is even a further object of the present invention to provide an apparatus for generating power, which power can be used for marine or land applications.

The present invention relates to a method and apparatus for generating power from voltage gradients at sediment-water interfaces (although it is recognized that this method and apparatus may be readily adapted to euxinic water bodies). A natural voltage gradient exists at and about the sediment-water interface because oxygen reduction is found at and about the sediment-water interface, nitrate, manganese and iron reduction frequently occurs in the top few centimeters of the sediment, and sulfate reduction occurs over the next meter or so within the sediment. Single or stacks of inert co-planar electrodes are used to facilitate energy harvesting. One electrode (anode) is positioned in sediment just below the sediment-seawater interface and the other electrode (cathode) is positioned above the sediment and over to the first electrode. The anode is lower in voltage than the cathode. Current will flow between the electrodes when they are connected through a load.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Microbial decomposition of organic matter in an aquatic sediments utilizes a depth-dependent succession of oxidizing agents in which the highest energy liberating oxidants are depleted first. Thus in typical coastal marine sediments, oxygen reduction is found at and above the sediment-water interface, nitrate, manganese, and iron reduction in the top few centimeters, and sulfate reduction over the next meter or so. The depth-dependency of microbe utilized oxidant gives rise to distinctive chemical gradients in sediment pore waters as each oxidant is successively exhausted ($O_2$, $MnO_2$, $HNO_3$, $Fe_2O_3$, $SO_4^{2-}$) and its reaction products ($H_2O$, $Mn^{2+}$, $Fe^{2+}$, $S^{2-}$) produced. A natural consequence of the progressively reduced anoxic sediment layers is a natural voltage gradient Thus when inert metal electrodes are inserted step-wise into marine sediment from above, a voltage is observed that decreases to as much as 0.8 V relative to a standard reference with increasing depth.

Figure 1:
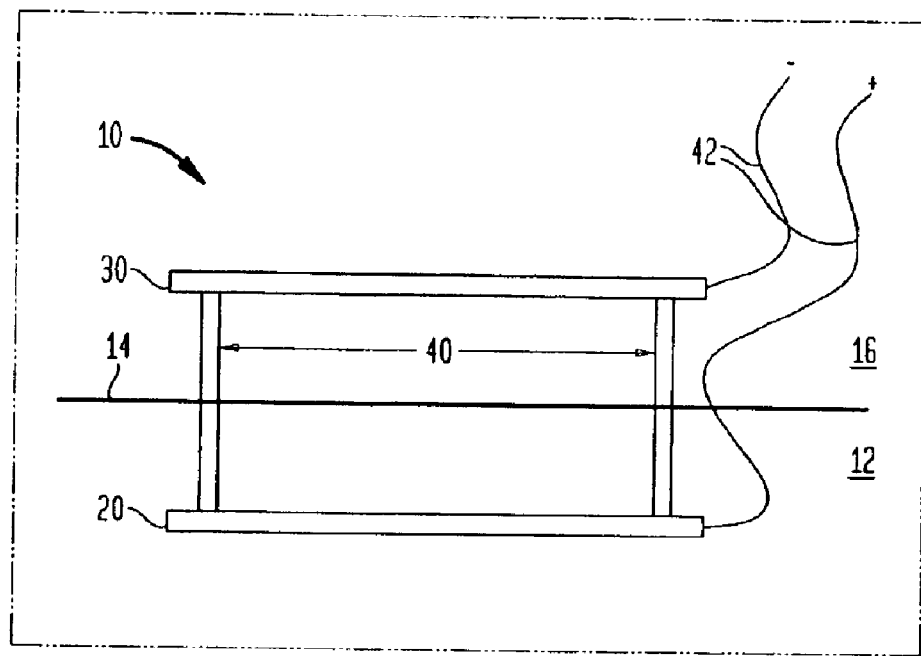
FIG. 1 is a schematic of the fuel cell for generating energy at an aquatic sediment-water interface according to the present invention.

Referring to FIG. 1, a schematic of the fuel cell of the present invention is generally indicated at 10. The fuel cell includes a first electrode (anode) 20 positioned in marine sediment 12 just below the marine sediment-seawater interface 14. The second electrode (cathode) 30 is positioned over to the first electrode 20 and is positioned in the seawater 16 just above the marine sediment-seawater interface. The relative positions of the anode 20 and cathode 30 are maintained by rig members 40. The electrodes could be parallel to each other. Electrical leads 42 connect the electrode to a load, not shown. In another embodiment, the electrodes can be positioned in proximity but not parallel to each other. As such, the first electrode is placed in the sediment, but the second electrode could be placed in the water, above the first electrode, at an angle to the first electrode. The second electrode could even be placed at a right angle to the first electrode. A plurality of second electrodes could be lined up and positioned above and perpendicular to the first electrode to optimize power.

By virtue of its position within the microbe established depth-dependent voltage gradient of the sediment 12, the anode 20 is lower in voltage than the cathode 30. When connected through a load (i.e., a resistor) a sustained load dependent current flows between the anode 20 and cathode 30 that can be used to provide electrical power. The electrodes can be solid, mesh, porous or non-porous. Electrode materials include, but are not limited to, platinum, gold, copper, silver, graphite, carbon fibers, which could be contained within fiberglass netting. The size and shape of the electrodes can be varied. Electrical contact are preferably made to each electrode with marine-rated insulated wire and marine-rated insulated epoxy covering conductive epoxy or solder.

Marine sediment/seawater interfaces have been modeled in the laboratory using aquaria containing harvested marine sediments and seawater. At the Naval Research Laboratory, sulfide-rich sediments obtained from a coastal marsh region near Tuckerton, N.J., were used. At Rutgers University iron-rich estuarine sediments from Raritan Bay, N.J. were used. Prototype power supplies consisting of two electrodes fixed in orientation about sediment-seawater interfaces by non-conductive, rigs were fabricated and demonstrated in both sediment types.

Figure 2:
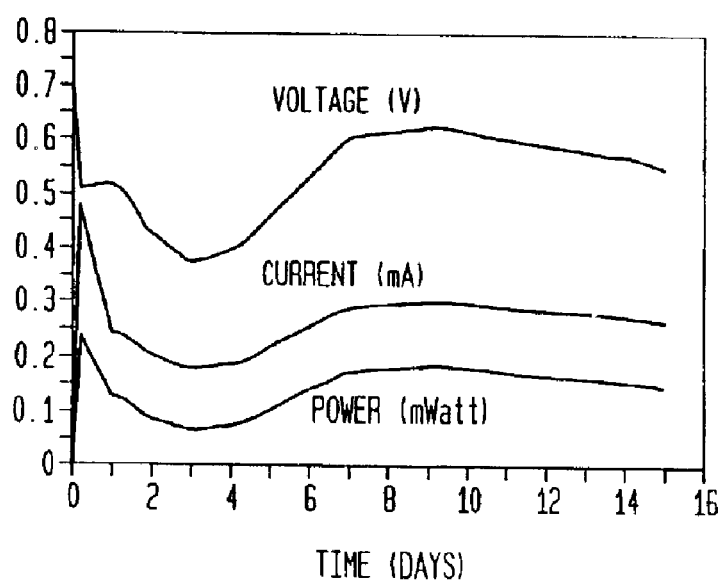
FIG. 2 is a graph of voltage, current and power between two platinum mesh electrodes having four square inch surface area configured as shown in FIG. 1 after connection of the electrode leads to a 5,000 ohm resistor.

As can be seen with reference to the graph shown in FIG. 2, results from prototype testing show the sustainable voltage is created between the electrodes. FIG. 2 shows voltage, current and power between two platinum mesh electrodes of four square inch surface area configured as represented in FIG. 1 with a connection of the electrical leads to a 5000 ohm resistor. This current can be used to provide continuous electrical power on the order of 0.5 $\mu$ Watts cm$^{-2}$. Power increases over time and is maintained by microbial oxidation of organic matter in the sediment which regenerates reduced solutes (fuel) that can be oxidized at the bottom electrode (anode) while also sustaining the voltage gradient. Sustainable power cannot be produced in autoclaved (killed) sediments.

The advantage of this power supply over batteries is the prospect of providing necessary power for prolonged periods of time (decades to indefinitely) without the need to replace the power supply because the power supply presumably consumes marine sediment organic matter, which is abundant and replenished by sedimentation and seawater oxygen, which is also abundant and replenished. The advantage of the power supply over the use of solar cells is its insensitivity to weather and its submarine utility. The advantages of the power supply over the use of direct links to ground available power by means of power conducting cables is cost and logistics. The new feature of the present invention is utilization of marine abundant fuels and oxidant as they are found in the environment in which the power supply is intended for use. Therefore, neither fuel nor oxidant need be deployed or actively transported.

Microbial activity and associated thermodynamically favored biogeochemical reactions create chemical zonation in natural sediments, saturated soils and stratified water columns. The relative concentrations of the chemical constituents in each depth zone determine an electric potential, and vertical profiles of this "redox potential" often decrease by 0.5 to 0.8 volts. In sediments these gradients are often over centimeter scales when measured from the overlying water into the sediment.

Measurements of the concentrations of different redox species within the vicinity of the fuel cell electrodes placed in estuarine and salt marsh sediments indicate that the dominant anode reaction(s) may be:

$$S^{2-}+4H_2O=SO_4^{2-}+8H^++8e^- \text{ or}$$

$$2Fe_4^{2+}+3H_2O=Fe_2O_3+6H^++2e^-$$

whereas the cathode reaction is:

$$2O_2+8H^++8e^-=4H_2O$$

Specific applications of the fuel cell of the present invention include the sustained powering of marine deployed electronics (e.g., sonar beacons and sensors) either as the sole power supply or as supplement to existing power supplies (e.g., recharging batteries). The present invention has application for low power devices, and additionally for generating large amounts of power if done on a larger scale. Further, the generated power can be used for land-based applications where it may be desirable to utilize large components to generate large amounts of power.

Having thus described the invention in detail, it is to be understood that the foregoing description is not intended to limit the spirit and scope thereof. What is desired to be protected by Letters Patent is set forth in the appended claims.

What is claimed is:

1. An apparatus for generating energy at the interface of aquatic sediment and seawater comprising:
    a first anode electrode embedded within the aquatic sediment;
    a second cathode electrode positioned within the seawater and above the aquatic sediment;
    rig means for maintaining the relative positions of the anode and cathode electrodes; and
    electrical leads extending from the anode and cathode electrodes to a load.

2. The apparatus of claim 1 wherein the anode electrode is positioned below the interface of the aquatic sediment and the seawater.

3. The apparatus of claim 1 wherein the electrodes are planar or stacked.

4. The apparatus of claim 3 wherein the cathode electrode is positioned parallel to the anode electrode.

5. The apparatus of claim 3 wherein the cathode electrode is positioned at an angle with respect to the anode electrode.

6. The apparatus of claim 5 wherein the cathode electrode is positioned at a right angle with respect to the anode electrode.

7. The apparatus of claim 6 wherein a plurality of cathode electrodes are positioned over the anode electrode.

8. The apparatus of claim 2 wherein the anode is lower in voltage than the cathode.

9. The apparatus of claim 2 wherein the electrodes comprise platinum.

10. The apparatus of claim 9 wherein the electrodes comprise platinum-mesh.

11. The apparatus of claim 2 wherein the electrodes comprise gold.

12. The apparatus of claim 11 wherein the electrodes comprise gold-mesh.

13. The apparatus of claim 2 wherein the electrodes comprise copper foil.

14. The apparatus of claim 2 wherein the electrodes comprise silver foil.

15. The apparatus of claim 2 wherein the electrodes comprise graphite felt.

16. The apparatus of claim 2 wherein the electrodes comprise carbon fibers contained within fiber glass netting.

17. A method of generating power from voltage gradients at interfaces between water and aquatic sediment comprising:

positioning a first electrode in sediment below the interface;

positioning a second electrode in the water over the first electrode; and connecting electrical leads between the electrodes and a load to create a current between the electrodes.

18. The method of claim 17 further comprising retaining the second electrode in position with respect to the first electrode by interconnecting rigging therebetween.

19. The method of claim 17 further comprising positioning the second electrode parallel to the first electrode.

20. The method of claim 17 further comprising positioning the second electrode at an angle to the first electrode.

21. The method of claim 20 wherein the second electrode is positioned at a right angle to the first electrode.

22. The method of claim 21 further comprising positioning a plurality of second electrodes over the first electrode.

* * * * *